United States Patent [19]
Howard

[11] Patent Number: 5,115,439
[45] Date of Patent: May 19, 1992

[54] POLE PIECE TO SHAPE AXIAL MAGNETIC FIELD IN GAS LASER

[75] Inventor: Neil Howard, San Jose, Calif.

[73] Assignee: Spectra-Physics Lasers, Inc., Mountain View, Calif.

[21] Appl. No.: 443,560

[22] Filed: Nov. 29, 1989

[51] Int. Cl.$^5$ ............................................. H01S 3/00
[52] U.S. Cl. ..................................... 372/37; 372/61; 372/55; 372/33
[58] Field of Search ................... 372/37, 55, 61, 33, 372/92

[56] References Cited

U.S. PATENT DOCUMENTS

| | | | |
|---|---|---|---|
| 4,397,025 | 8/1983 | Kebabian | 372/37 |
| 4,649,547 | 3/1987 | Carlson et al. | 372/37 |
| 4,748,632 | 5/1988 | Preston | 372/37 |
| 4,755,999 | 7/1988 | Macken | 372/33 |
| 4,811,355 | 3/1989 | Krueger et al. | 372/37 |
| 4,847,841 | 7/1989 | Lamprecht et al. | 372/37 |

OTHER PUBLICATIONS

"CRC Handbook of Chemistry and Physics, College Edition," 47th Edition, 1966–1967, pp. E-102 and E-103.

A. S. Halsted et al., "Gaseous Ion Laser Research," Hughes Research Laboratories, Technical Report AFAL-TR-68-227, Jul. 1968.

Primary Examiner—Léon Scott, Jr.
Attorney, Agent, or Firm—Fliesler, Dubb, Meyer & Lovejoy

[57] ABSTRACT

A gas discharge tube for a gas laser includes a discharge chamber having a first end and a second end. A cathode is mounted near the first end in a cathode region of the discharge chamber and an anode is mounted near the second end. An electromagnet induces an axial magnetic field within the discharge region, and a pole piece is mounted on the end of the electromagnet adjacent the cathode region. By using a pole piece for attenuating the axial magnetic field in the cathode region, a significant reduction in 60-60 Hz modulation of the light beam is realized, as well as a reduction of sputtering in the throat region of the discharge tube, additionally, the cathode placement relative to the throat region may be optimized leading to an increase in plasma tube efficiency. In addition, a second pole piece is mounted on the end of the electromagnetic coil, adjacent the anode region, for attenuating the axial magnetic field inside the anode region after the discharge reaches the anode.

31 Claims, 4 Drawing Sheets

POLE PIECE TO SHAPE AXIAL MAGNETIC FIELD IN GAS LASER

FIELD OF THE INVENTION

The present invention relates to gas lasers in which an axial magnetic field through the gas discharge tube is used to constrict the gas discharge.

DESCRIPTION OF RELATED ART

Gas lasers comprise a gas discharge tube with a cathode mounted on one end and an anode mounted at the other end. Between the anode and the cathode, a gas discharge region supports laser gain through a laser bore in the center of the tube. An axial magnetic field is used to assist confinement and stabilization of the discharge region within the bore. A stable discharge is important for a quality laser output beam.

The cathodes utilized with typical prior art gas lasers have been manufactured in the form of a helical coil that is electrically heated with an alternating current at 50 or 60 Hertz. This alternating current in the cathode induces a small fluctuating magnetic field in the cathode region of the gas discharge tube that can have an impact on the stability of the discharge.

If the fluctuating magnetic field of the cathode region is coupled with the axial magnetic field to a sufficient degree, then the fluotuating magnetic field induces noise in the laser output. Accordingly, it is desirable to decouple the axial magnetic field from any magnetic field induced by the cathode.

FIG. 1 illustrates one end of a gas discharge tube of the prior art. The gas discharge tube 10 consists of a ceramic cylinder which is sealed with an end cap 11. A cathode coil 12 is mounted with the end cap and inserted into the gas discharge chamber of the tube 10. The space along the gas discharge tube in which the cathode resides is termed the cathode region 13. An electromagnetic coil 14 is wrapped around the gas discharge tube 10 to induce an axial magnetic field in the discharge region 15 of the tube 10. As shown in FIG. 1, the cathode 12 extends about 2.1 inches from the end cap 11. The first cooling web 16, which starts defining the throat 15 of the bore through the discharge tube, is located about 2.4 inches away from the end of the cathode 12. The electromagnet coils 14 end about 2.9 inches away from the end of the cathode 12.

The embodiment shown in FIG. 1 leaves a significant distance from the cathode 12 to the throat of the discharge region bore. This area will be filled with gas ionized by the discharge current. This distance results in significant heat dissipation and requires a larger voltage potential across the discharge tube than is desirable. However, the distance between the magnet and the cathode region 13 reduces the coupling between the magnetic field generated by the cathode and that generated by the magnet 14.

FIG. 2 illustrates an alternative embodiment of the prior art. As can be seen in this system, the discharge tube 20 includes a ceramic cylinder which extends to an end cap 21. A cathode coil 22 extends into the tube 20. The first web 23 which starts the throat 25 of the discharge region is approximately 1.3 inches from the end of the cathode coil 22. The electromagnetic coils 24 extend beyond the web 23 to near the edge of the cathode region 25. However, because the axial magnetic field is coupled with the magnetic field induced by the cathode 22, a 50 or 60 Hertz ripple is induced in the laser output.

To address these problems, and others, it is desirable to control the characteristics of the axial magnetic field to maximize the efficiency and stability of the discharge tube.

SUMMARY OF THE INVENTION

The present invention provides an improved gas laser which includes a discharge tube having a first end and a second end. A discharge region lies between the first and second ends of the tube. A cathode is mounted near the first end in a cathode region of the discharge chamber. A magnet induces an axial magnetic field within the discharge region, and a pole piece, or other means for shaping the axial magnetic field so that it is reduced inside the cathode region, is mounted near the end of the magnet adjacent the cathode region. By using a pole piece or other means for shaping the axial magnetic field near the cathode region, the discharge is stabilized and the interaction of the cathode magnetic field and the axial magnetic field is reduced, substantially reducing the 50-60 Hz ripple in the light signal. Manipulation of the axial magnetic field allows placement of the cathode closer to the throat region, resulting in an increase in electrical efficiency of the plasma tube without incurring increased 50-60 Hz ripple.

In addition, the discharge tube includes an anode mounted adjacent the second end in an anode region of the discharge tube. A second pole piece is mounted near the end of the magnet, adjacent the anode region, for shaping the axial magnetic field inside the anode region after the discharge reaches the anode. This stabilizes the termination of the discharge at the anode.

Other aspects and advantages of the present invention can be seen upon review of the figures, the detailed description and the claims which follow.

DETAILED DESCRIPTION

A detailed description of a preferred embodiment of the present invention is described with reference to FIGS. 3-6.

Figure 1:
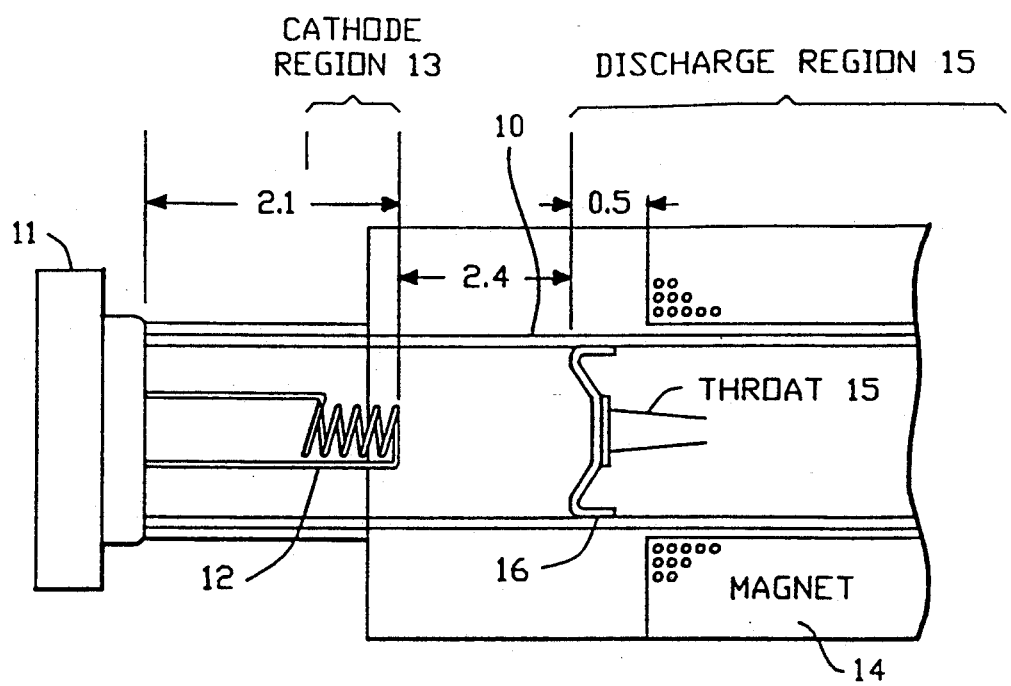
FIG. 1 is a schematic diagram of the cathode and discharge regions of a first prior art gas laser system.
Figure 2:
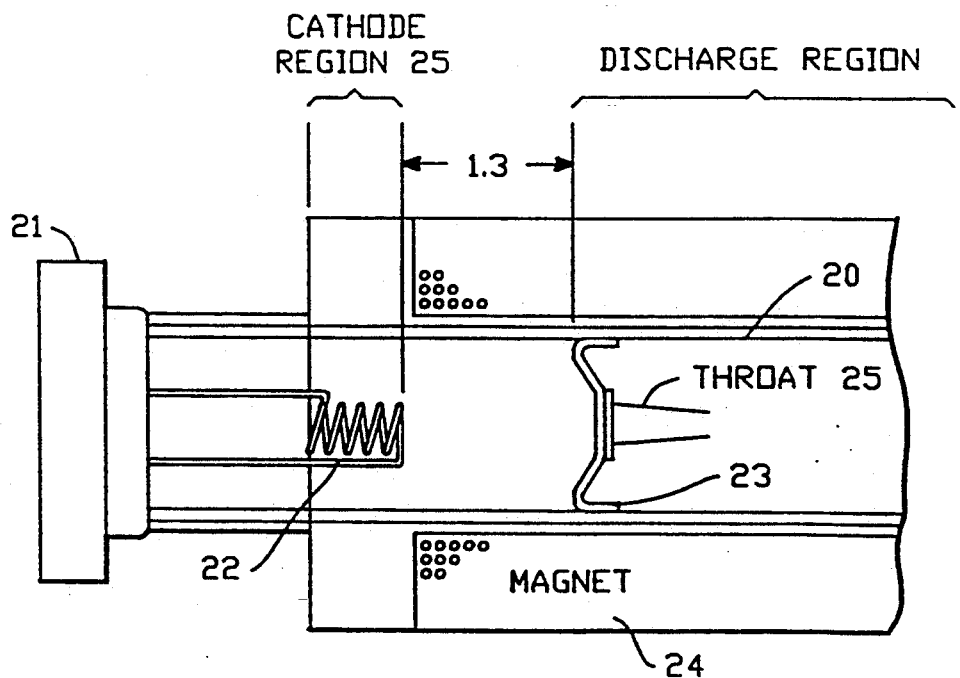
FIG. 2 is a schematic diagram of the cathode and discharge regions of a second prior art gas laser system.
Figure 3:
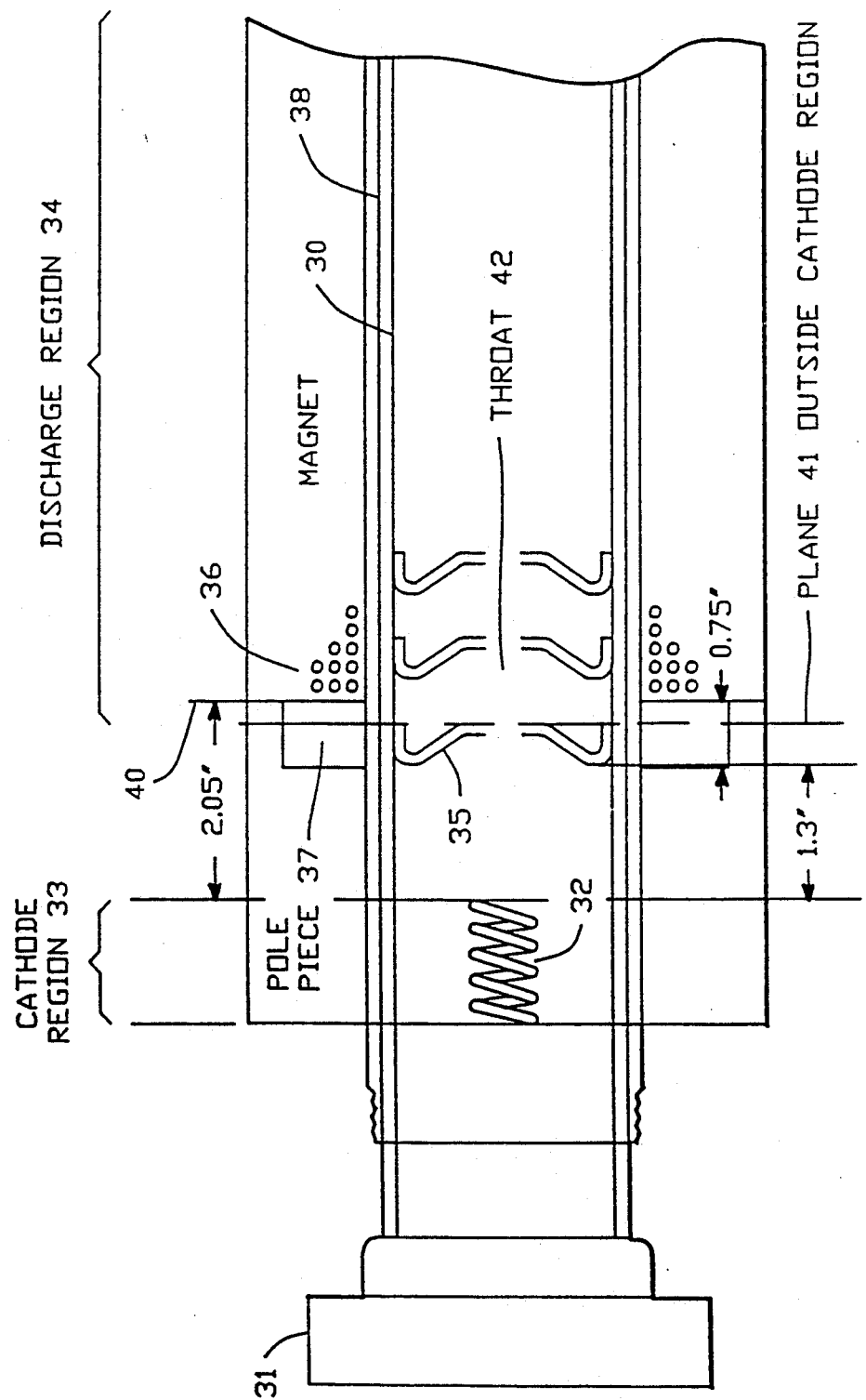
FIG. 3 is a schematic diagram of the cathode end of the gas discharge tube in the improved laser according to the present invention.

FIG. 3 illustrates the cathode end of a discharge tube of a modified Spectra-Physics Model 2020 gas laser tube according to the present invention. The discharge tube includes a cylindrical wall 30 which is sealed at end cap 31 and defines a discharge chamber. The cathode 32 is mounted in a cathode region 33 of the discharge chamber. A throat 42 of discharge region 34 begins at the first web 35 in the bore of the chamber. Electromagnetic coil 36 is wrapped around a magnet bobbin 38 outside the cylindrical wall 30 of the discharge tube and extends along the length of the tube. The end of the electromagnetic coil 36 is about 2.05 inches from the end of the cathode region 33. A pole piece 37 is mounted with a first face about 1.3 inches from the end of the cathode region and a second face at the end 40 of the electromagnet 36. The pole piece 37 is mounted in a plane 41 outside the cathode region 33.

The pole piece 37 is toroidal with a rectangular cross-section 0.75 inches wide, and 0.65 inches high, formed of cold rolled steel.

Figure 4:
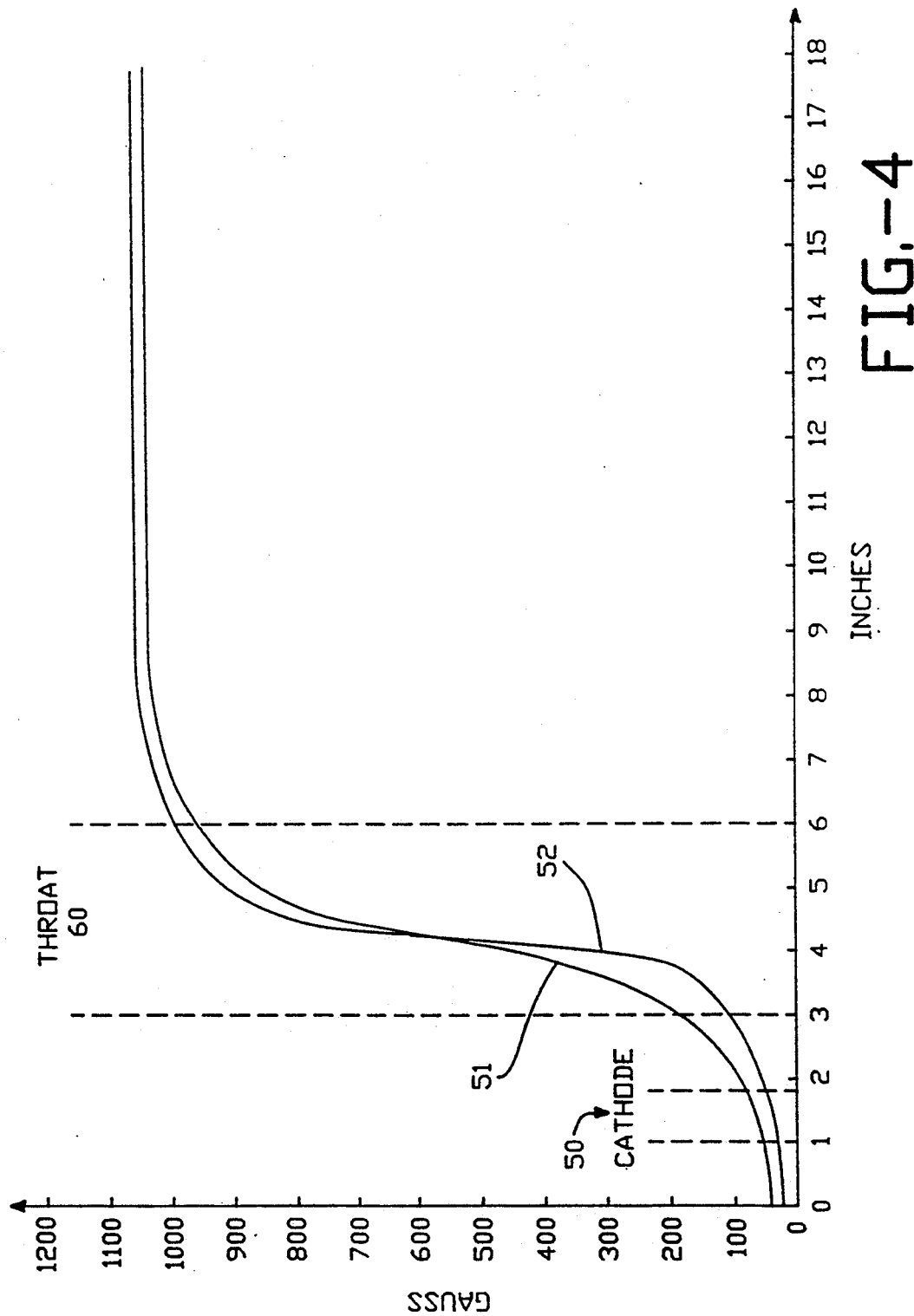
FIG. 4 is a graph showing the strength of the axial field shaping according to the present invention.

FIG. 4 illustrates the strength of the axial magnetic field versus distance in the cathode region 33 and the throat 42 of the discharge tube of FIG. 3. In the chart of FIG. 4, the cathode region is outlined at point 50 and the throat is outlined at point 60.

The first trace 51 illustrates the strength of the magnetic field without pole piece 37. The second trace 52 illustrates the strength of the magnetic field with the pole piece 37. It can be seen that without the pole piece, the shape of the magnetic field through the throat 60 and the cathode region 50 falls off more gently than the shape with the pole piece. The unshaped axial field is significantly coupled to the magnetic field induced by the coils of the cathode 32. Because of this coupling, a fluctuation at the frequency of the current heating the cathode can be detected in the output of the laser.

Trace 52 of FIG. 4 illustrates that the shaped axial magnetic field falls off sharply in the throat region 60 and is substantially reduced in the cathode region 50. This stabilizes the discharge and minimizes the coupling of the magnetic field of the cathode with the axial magnetic field. It has been found that this system results in about 40% reduction in noise at the 514.5 nm line in an argon ion laser (Model SP 2020, manufactured by the assignee of the patent application).

The pole piece 37 in the embodiment shown in FIG. 3 is formed of cold rolled steel. Other materials could be used that have permeability sufficient to cause shaping of the field lines of the axial magnetic field. Materials having higher permeability than cold rolled steel may be preferred to provide greater control in shaping of the axial magnetic field. Suitable high permeability materials can be found by reference to standard technical references, such as the CRC HANDBOOK OF CHEMISTRY AND PHYSICS. Such materials include purified iron, permalloy, and supermalloy.

The configuration and geometry of the pole piece also affect the shaping of the axial magnetic field. The designer should choose a material, configuration and geometry as suits the needs of a particular application. For instance, applicant has designed systems with pole pieces inch wide and positioned slightly further away from the cathode than in the embodiment of FIG. 3.

Figure 5:
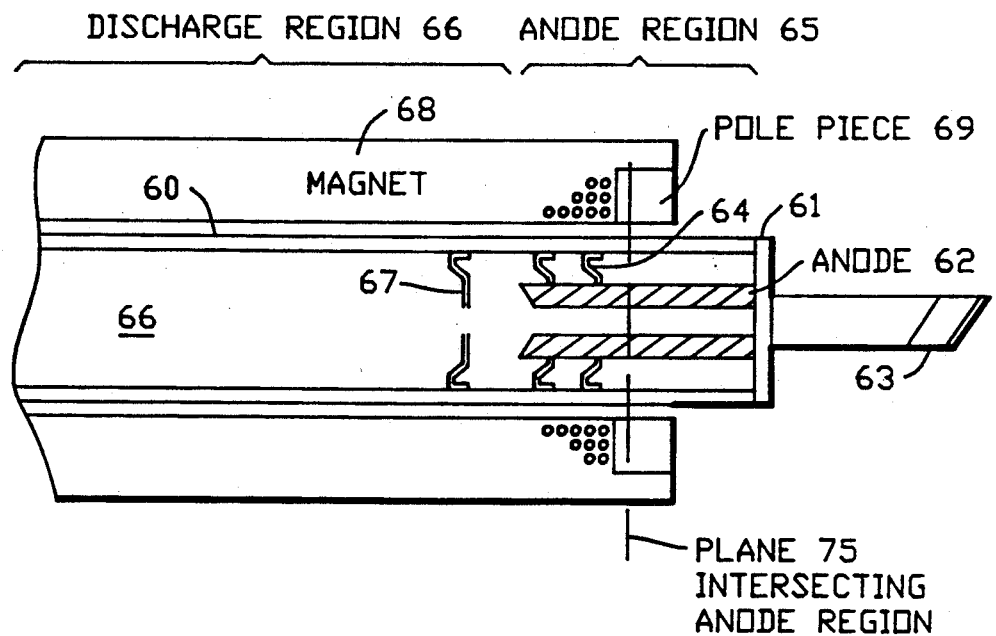
FIG. 5 is a schematic diagram of the anode end of the discharge tube of an improved laser according to the present invention.

FIG. 5 illustrates the anode end of the discharge tube according to the present invention. The discharge tube has a cylindrical wall 60 which is sealed by end cap 61. An anode 62 is mounted on end cap 61. End cap 61 is coupled to a Brewster window 63 to allow a laser beam to pass through the discharge tube. The anode 62 is supported by heat webs (e.g., 64) inside an anode region 65 of the discharge chamber 66. The heat webs (e.g., web 67) are mounted along the chamber 66 to the cathode end as known in the art.

It is desirable to have the discharge stabilized from the discharge region 66 well into the anode 62. Thus, coils of magnet 68 coils extend substantially into the anode region 65. A pole piece 69 is mounted in a plane 75 well inside the anode region of the discharge tube to cause shaping of the axial magnetic field after the discharge reaches the anode 62.

This allows stabilization of the discharge by the axial magnetic field to be maintained into the anode 62.

Again, the design, positioning, geometry and material used for the pole piece 69 should be selected to optimize operation of the specific gas discharge tube.

Figure 6:
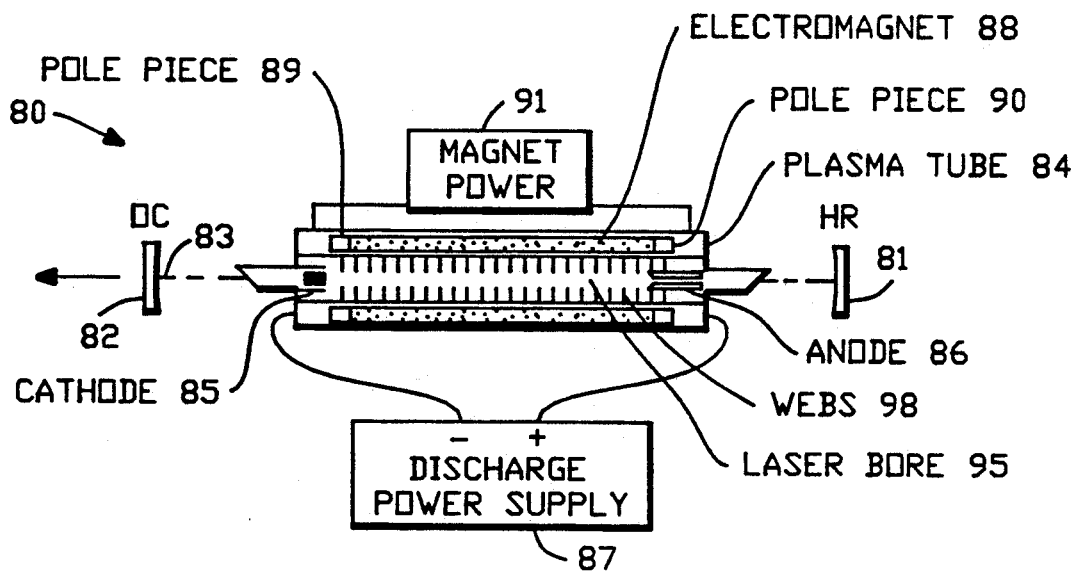
FIG. 6 is a simplified diagram of a gas laser according to the present invention.

FIG. 6 is a schematic diagram of a gas laser 80 implementing the present invention.

The laser 80 includes a resonant cavity formed by the high reflecting mirror 81 and the output coupler 82, which define a resonant path 83. A gas discharge tube 84 is used to supply laser gain. The tube includes a cathode 85 on a first end, and an anode 86 on the second end. A DC voltage is supplied across the anode and the cathode by discharge power supply 87. In addition, an AC signal is supplied to the cathode by the discharge power supply 87 to heat the cathode and induce emission of electrons into the laser bore 95. The heat webs 98 are schematically illustrated lining the laser bore 95.

The tube 84 also includes an electromagnet 88 wound on a magnet bobbin around the gas discharge tube 84. A first pole piece 89 is coupled with the electromagnet 88 near the cathode end of the tube 84. A second pole piece 90 is coupled with the electromagnet 88 near the anode end of the tube 84. A magnet power supply 91 is coupled across the coils of the electromagnet 88 to supply power for the axial magnetic field.

Accordingly, an improved gas laser with a magnet assembly using pole pieces to shape the axial magnetic field according to a desired characteristic has been disclosed. Using the techniques of the present invention, a significant reduction of the 50-60 Hz ripple in the plasma and output light are realized. Furthermore, the reduction in length of the fringing fields of the axial magnet allow closer placement of the cathode to the throat region, resulting in an increase in plasma tube efficiency. The shaped field has also resulted in reduced sputtering in the throat region, reducing gas consumption rates.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. In a gas laser comprising a gas discharge tube having a first end, a second end and a discharge region between the first and second ends; a cathode, mounted adjacent the first end in a cathode region of the discharge tube; and means, mounted with the discharge tube, for inducing an axial magnetic field within the discharge region; an improvement comprising:

means, coupled with the means for inducing the axial magnetic field, and adjacent the first end of the discharge tube, for shaping the axial magnetic field to reduce the axial magnetic field in the cathode region.

2. The improvement of claim 1, wherein the means for shaping comprises a pole piece.

3. The improvement of claim 1, wherein the means for shaping comprises a pole piece mounted in a plane outside the cathode region.

4. In a gas laser comprising a gas discharge tube having a first end, a second end and a discharge region between the first and second ends; a cathode, mounted adjacent the first end in a cathode region of the discharge tube; an anode, mounted adjacent the second end in an anode region of the discharge tube; and means, mounted with the discharge tube, for inducing an axial magnetic field within the discharge region; an improvement comprising:

means, coupled with the means for inducing the axial magnetic field, and adjacent the second end of the discharge tube, for shaping the axial magnetic field inside the anode region.

5. The improvement of claim 4, wherein the means for shaping comprises a pole piece.

6. The improvement of claim 4, wherein the means for shaping comprises a pole piece mounted in a plane intersecting the anode region.

7. A gas laser, comprising:
a resonant cavity, including an output coupler;
a gas discharge tube mounted in the resonant cavity and having a first end, a second end and a discharge region between the first and second ends;
a cathode, mounted adjacent the first end in a cathode region of the discharge tube;
an anode mounted adjacent the second end in an anode region of the discharge tube;
power supply means, coupled to the anode and the cathode, for inducing gas discharge in the discharge region to support laser gain;
means, mounted with the discharge tube, for inducing an axial magnetic field within the discharge region; and
first means, coupled with the means for inducing, and adjacent the first end of the discharge tube, for shaping the axial magnetic field, so that the axial magnetic field is reduced in the cathode region.

8. The laser of claim 7, further including means, connected to the cathode, for supplying an alternating electric current through the cathode to heat the cathode, thereby inducing a cathode magnetic field in the cathode region, and wherein the first means for shaping reduces the axial magnetic field in the cathode region so that the axial magnetic field is substantially decoupled from the cathode magnetic field.

9. The laser of claim 7, wherein the means for inducing comprises:
an electromagnet coil around the discharge region, and having a first end near the first end of the discharge tube and a second end near the second end of the discharge tube; and the first means for shaping comprises:
a pole piece, mounted adjacent the first end of the electromagnet coil.

10. The laser of claim 9, wherein the pole piece is mounted in a plane outside the cathode region.

11. The laser of claim 7, wherein the first means for shaping comprises a pole piece.

12. The laser of claim 11, wherein the pole piece is mounted in a plane outside the cathode region.

13. The laser of claim 7, further including:
second means, coupled with the means for inducing the axial magnetic field, and adjacent the second end of the discharge tube, for shaping the axial magnetic field inside the anode region.

14. The laser of claim 13, wherein the second means for shaping comprises a pole piece.

15. The laser of claim 14, wherein the pole piece is mounted in a plane intersecting the anode region.

16. A gas laser, comprising:
a resonant cavity, including an output coupler;
a gas discharge tube mounted in the resonant and having a first end, a second end and a discharge region between the first and second ends;
a cathode, mounted adjacent the first end in a cathode region of the discharge tube;
an anode, mounted adjacent the second end in an anode region of the discharge tube;
power supply means, coupled to the anode and the cathode, for inducing gas discharge in the discharge region to support laser gain;
means, mounted with the discharge tube, for inducing an axial magnetic field within the discharge region; and
means, coupled with the means for inducing the axial magnetic field, and adjacent the second end of the discharge tube, for shaping the axial magnetic field inside the anode region.

17. The laser of claim 16, wherein the means for inducing comprises:
an electromagnet coil mounted outside the discharge chamber over the discharge region, and having a first end near the first end of the discharge tube and a second end near the second end of the discharge tube; and the means for shaping comprises:
a pole piece, mounted adjacent the second end of the electromagnet coil.

18. The laser of claim 17, wherein the pole piece is mounted in a plane intersecting the anode region.

19. The laser of claim 16, wherein the second means for shaping comprises a pole piece.

20. The laser of claim 19, wherein the pole piece is mounted in a plane intersecting the anode region.

21. A gas laser, comprising:
a resonant cavity, including an output coupler;
a gas discharge tube mounted in the resonant cavity and having a first end, a second end and a discharge region between the first and second ends;
a cathode, mounted adjacent the first end in a cathode region of the discharge tube;
an anode, mounted adjacent the second end in an anode region of the discharge tube;
power supply means, coupled to the anode and the cathode, for inducing gas discharge in the discharge region to support laser gain;
means, mounted with the discharge tube, for inducing an axial magnetic field within the discharge region;
first means, coupled with the means for inducing, and adjacent the first end of the discharge tube, for shaping the axial magnetic field, so that the axial magnetic field is reduced in the cathode region;
second means, coupled with the means for inducing the axial magnetic field, and adjacent the second end of the discharge tube, for shaping the axial magnetic field inside the anode region.

22. The laser of claim 21, further including means, connected to the cathode, for supplying an alternating electric current through the cathode to heat the cathode, thereby inducing a cathode magnetic field in the cathode region, and wherein the first means for shaping reduces the axial magnetic field in the cathode region so that the axial magnetic field is substantially decoupled from the cathode magnetic field.

23. The laser of claim 21, wherein the means for inducing comprises:

an electromagnet coil mounted outside the discharge chamber over the discharge region, and having a first end near the first end of the discharge tube and a second end near the second end of the discharge tube; and wherein the first means for shaping comprises a pole piece, mounted adjacent the first end of the electromagnet coil; and the second means for shaping comprises a pole piece, mounted adjacent the second end of the electromagnet coil.

24. The laser of claim 21, wherein the first means for shaping comprises a pole piece.

25. The laser of claim 24, wherein the pole piece is mounted in a plane outside the cathode region.

26. The laser of claim 21, wherein the second means for shaping comprises a pole piece.

27. The laser of claim 26, wherein the pole piece is mounted in a plane intersecting the anode region.

28. In a gas laser comprising a gas discharge tube having a first end, a second end and a discharge region between the first and second ends; a cathode, mounted adjacent the first end in a cathode region of the discharge tube; and means, mounted with the discharge tube, for inducing an axial magnetic field within the discharge region; an improvement comprising:

a pole piece, coupled with the means for inducing the axial magnetic field, and adjacent the first end of the discharge tube, for shaping the axial magnetic field to substantially decouple the axial magnetic field from the cathode.

29. In a gas laser comprising a gas discharge tube having a first end, a second end and a discharge region between the first and second ends; a cathode, mounted adjacent the first end in a cathode region of the discharge tube; an anode, mounted adjacent the second end in an anode region of the discharge tube; means for supplying power across the anode and the cathode induce gas discharge within the discharge region; and means, mounted with the discharge tube, for inducing an axial magnetic field within the discharge region; an improvement comprising:

a pole piece, coupled with the means for inducing the axial magnetic field, and adjacent the second end of the discharge tube, for shaping the axial magnetic field to stabilize termination of the gas discharge in the anode region.

30. A gas laser, comprising:

a resonant cavity, including an output coupler;

a gas discharge tube mounted in the resonant cavity and having a first end, a second end and a discharge region between the first and second ends;

a cathode, mounted adjacent the first end in a cathode region of the discharge tube;

an anode, mounted adjacent the second end in an anode region of the discharge tube;

power supply mans, coupled to the anode and the cathode, for inducing gas discharge in the discharge region to support laser gain;

an electromagnet coil around the discharge region, and having a first end near the first end of the discharge tube and a second end near the second end of the discharge tube, for inducing an axial magnetic field in the discharge region;

means, connected to the cathode, for supplying an alternating electric current through the cathode to that the cathode, thereby inducing a cathode magnetic field in the cathode region; and a pole piece mounted with the electromagnetic coil and adjacent the first end of the discharge tube, for shaping the axial magnetic field, so that the axial magnetic field is substantially decoupled from the cathode magnetic field.

31. A gas laser, comprising:

a resonant cavity, including an output coupler;

a gas discharge tube mounted in the resonant cavity and having a first end, a second end and a discharge region between the first and second ends;

a cathode, mounted adjacent the first end in a cathode region of the discharge tube;

an anode, mounted adjacent the second end in an anode region of the discharge tube;

power supply means, coupled to the anode and the cathode, for inducing gas discharge in the discharge region to support laser gain;

an electromagnet coil around the discharge region, and having a first end near the first end of the discharge tube and a second end near the second end of the discharge tube for inducing an axial magnetic field in the discharge region; and a pole piece, mounted with the electromagnetic coil and in a plane intersecting the anode region, for shaping the axial magnetic field in the anode region so that the axial magnetic field extends substantially into the anode region to stabilize termination of the discharge in the anode.

* * * * *